March 30, 1926.

A. ALTMANN

FLYING ROUNDABOUT

Filed Nov. 15, 1924

1,579,173

Inventor:
August Altmann

Patented Mar. 30, 1926.

1,579,173

UNITED STATES PATENT OFFICE.

AUGUST ALTMANN, OF NEW YORK, N. Y.

FLYING ROUNDABOUT.

Application filed November 15, 1924. Serial No. 750,047.

*To all whom it may concern:*

Be it known that I, AUGUST ALTMANN, a citizen of the German Republic, residing at New York, New York, United States of America, have invented certain new and useful Improvements in Flying Roundabouts, of which the following is a specification.

This invention relates to an improvement in the roundabouts in which the vehicles of any type are suspended on long ropes, rods or chains so that when the roundabout is at rest or in movement they do not touch the ground and fly along the path owing to the action of the centrifugal force when the roundabout is going round.

The invention has for its object to utilize the gravity of the vehicle and the swinging movement of the same to effect automatically during the movement the covering of the vehicles which at the state of rest are open. The vehicles at rest might be covered in which case at the swinging out of the same they would be uncovered automatically. The effect will be exciting to the public as the occupants of the vehicle are at times completely hidden, the vehicles being painted so that the most various illusions are produced.

The construction of the roundabout is indifferent and the vehicles may be of any type. On the accompanying drawing, which illustrates an embodiment of the invention, a high roundabout on pillars is shown by way of example, which comprises long outriggers to which vehicles in the shape of fish are attached. The roundabout may however be of any other form of construction and other types of vehicles might be used.

In the drawings:—

Figure 1:
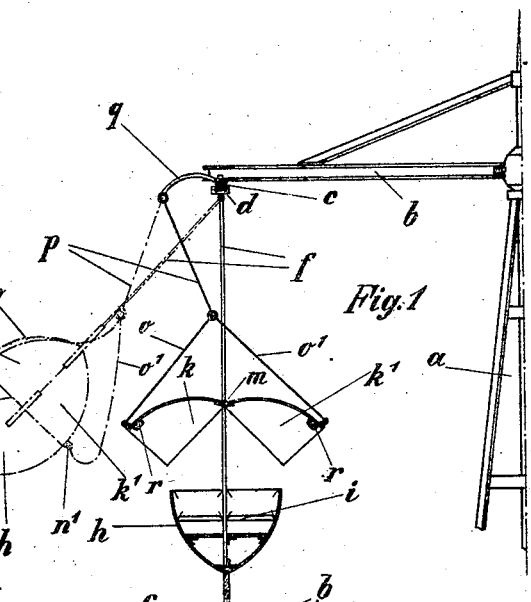
Fig. 1 shows in elevation the central column, an outrigger and a vehicle suspended on the same, the vehicle being shown in cross section, a second vehicle shown in dash-and-dot lines viewed from behind being in the swung out position.
Figure 2:
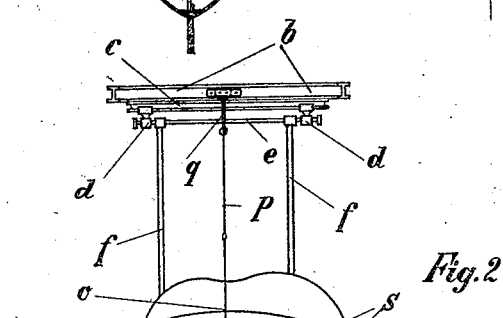
Fig. 2 shows the vehicle in front elevation seen from the outside of the roundabout.
Figure 3:
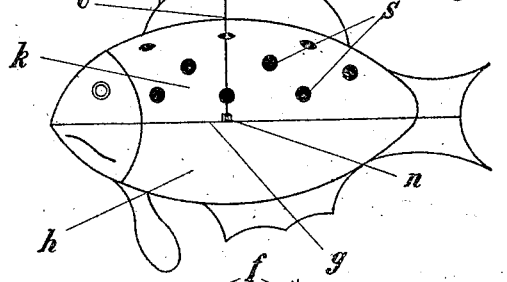
Fig. 3 is a section along the longitudinal axis of the vehicle.
Figure 3:
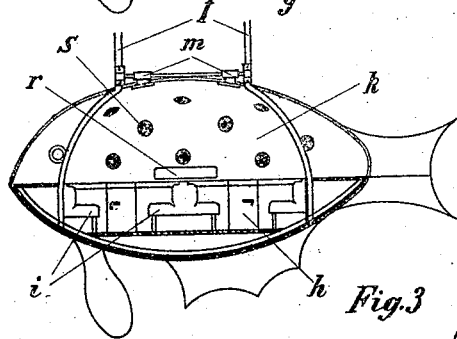

From the central column $a$ of the roundabout extend the horizontal supporting members $b$. Between every two horizontal members a horizontal rod $e$ is arranged which is mounted in bearings $d$ carried by a cross rod $c$. Two rods $f$ which carry a vehicle $g$ in their curved lower ends are mounted at the upper ends on said horizontal rod $e$. The lower ends of the suspension rods $f$ are securely fixed on the keel of the vehicle $g$. The vehicle $g$ which for instance is of fish shape is divided in horizontal direction into a lower compartment which serves as car $h$ and has seats $i$ and into an upper compartment which, as will be hereinafter described, is constructed to form the hood of the car. This hood is composed of two longitudinal halves $k$ and $k'$ hingedly fixed on the suspension rods $f$ by means of hinges $m$. The pulling down of the hood is effected with the aid of ropes $o$ and $o'$ attached to the lowest points of the hood, a third rope $p$ being attached at the lower end to said two ropes and at the upper end to an outrigger $q$ extending from the cross rod $c$. In the form of construction shown by way of example the two halves $k$ and $k'$ of the hood, which have counterweights $r$ are raised when the vehicle $g$ is at rest and they are lowered and closed owing to the shortening of the ropes $o$, $o'$ and $p$ when the vehicle swings out, but the inverse effect can be obtained by turning the outrigger in the opposite direction. When the action of the centrifugal force decreases the ropes are stretched again and the halves $k$ and $k'$ of the hood are raised. The hood has round windows $s$ closed by wire gauze which serve as outlooks and as air holes.

I claim:—

1. A flying roundabout comprising in combination, a centrally rotating shaft, radial sweeps fixed on said centrally rotating shaft, a rectangular articulated frame at the front end of each sweep, a vehicle mounted in said rectangular frame, a hood on said vehicle said hood being composed of two halves hingedly connected the one with the other, a curved outrigger hingedly fixed on the front end of each sweep, a rod attached to the front end of said outrigger so that it can swing on the same, and two ropes attached to the lower end of said rod and to the outer end of the corresponding half of said hood so that when the vehicle is at rest said ropes are stretched and raise the hood from the vehicle but when the vehicle is swung out, said ropes are slack and lower the hood onto the vehicle.

2. A flying roundabout comprising in combination a centrally rotating shaft, radial sweeps fixed on said centrally rotating shaft, a rectangular articulated frame at the front end of each sweep, a vehicle mounted in said rectangular frame, a hood on said vehicle said hood being composed of two halves hingedly connected the one with the other, a curved outrigger hingedly fixed on the front end of each sweep, a rod attached to the front end of said outrigger so that it can swing on the same, and two ropes attached to the lower end of said rod and to the outer end of the corresponding half of said hood so that when the vehicle is swung out said ropes are stretched and raise the hood from the vehicle but when the vehicle is at rest said ropes are slack and lower the hood onto the vehicle.

In testimony whereof I affix my signature.

AUGUST ALTMANN.